(12) United States Patent
Zhou

(10) Patent No.: US 7,789,176 B2
(45) Date of Patent: Sep. 7, 2010

(54) ELECTRIC VEHICLE THERMAL MANAGEMENT SYSTEM

(75) Inventor: Peng Zhou, El Cerrito, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 639 days.

(21) Appl. No.: 11/786,108

(22) Filed: Apr. 11, 2007

(65) Prior Publication Data
US 2008/0251235 A1    Oct. 16, 2008

(51) Int. Cl.
*H01M 14/00*    (2006.01)
(52) U.S. Cl. .................................. 180/65.1; 429/26
(58) Field of Classification Search .............. 180/65.1, 180/65.31; 62/244; 429/26
See application file for complete search history.

(56) References Cited

U.S. PATENT DOCUMENTS

| | | | | |
|---|---|---|---|---|
| 5,058,391 A * | 10/1991 | Periot | ............... | 62/238.6 |
| 5,291,960 A * | 3/1994 | Brandenburg et al. | ..... | 180/65.27 |
| 5,483,807 A * | 1/1996 | Abersfelder et al. | .......... | 62/435 |
| 5,537,956 A * | 7/1996 | Rennfeld et al. | ......... | 123/41.29 |
| 6,124,644 A * | 9/2000 | Olson et al. | ................. | 290/1 B |
| 6,186,254 B1 * | 2/2001 | Mufford et al. | ............... | 429/13 |
| 6,213,233 B1 * | 4/2001 | Sonntag et al. | ........ | 180/65.245 |
| 6,347,528 B1 * | 2/2002 | Iritani et al. | ............... | 62/324.6 |
| 6,360,835 B1 | 3/2002 | Skala | | |
| 6,394,207 B1 | 5/2002 | Skala | | |
| 6,448,535 B1 * | 9/2002 | Ap | ............................. | 219/208 |
| 6,464,027 B1 | 10/2002 | Dage | | |
| 6,467,286 B2 * | 10/2002 | Hasebe et al. | ................. | 62/185 |
| 6,569,550 B2 * | 5/2003 | Khelifa | ......................... | 429/13 |
| 6,651,761 B1 * | 11/2003 | Hrovat et al. | ................. | 429/13 |
| 6,708,513 B2 | 3/2004 | Koehler et al. | | |
| 6,743,539 B2 * | 6/2004 | Clingerman et al. | .......... | 429/24 |
| 6,772,603 B2 | 8/2004 | Hsu et al. | | |
| 6,797,421 B2 * | 9/2004 | Assarabowski et al. | ....... | 429/26 |
| 7,048,044 B2 * | 5/2006 | Ban et al. | .................... | 165/202 |
| 7,150,159 B1 * | 12/2006 | Brummett et al. | ............. | 62/236 |
| 7,191,858 B2 * | 3/2007 | Vanderwees et al. | ..... | 180/65.31 |
| 7,259,469 B2 * | 8/2007 | Brummett et al. | ......... | 290/40 C |
| 7,591,143 B2 * | 9/2009 | Zeigler et al. | ................. | 62/236 |
| 7,591,303 B2 * | 9/2009 | Zeigler et al. | ............... | 165/271 |
| 2002/0027027 A1 * | 3/2002 | Skala | ......................... | 180/65.2 |
| 2002/0040896 A1 * | 4/2002 | Ap | ............................. | 219/208 |
| 2003/0193009 A1 * | 10/2003 | Dill | ............................. | 250/206 |
| 2005/0133215 A1 | 6/2005 | Ziehr et al. | | |
| 2005/0241865 A1 * | 11/2005 | Varenne | ..................... | 180/65.1 |

FOREIGN PATENT DOCUMENTS

KR    10-2004-0072247    8/2004

* cited by examiner

*Primary Examiner*—Paul N Dickson
*Assistant Examiner*—Vaughn T Coolman
(74) *Attorney, Agent, or Firm*—Patent Law Office of David G. Beck

(57) ABSTRACT

An efficient thermal management system (100) that utilizes a single heat exchanger (133) is provided. A refrigeration subsystem (103) cools the heat exchanger (133). A first coolant loop (139) in thermal communication with the heat exchanger (133) is used to cool the energy storage system (137). A second coolant loop (151) corresponding to the HVAC subsystem (107) is also in thermal communication with the heat exchanger (133). Preferably a third coolant loop (109) corresponding to the drive motor cooling subsystem (101) is coupleable to the HVAC coolant loop (151), thus providing an efficient means of providing heat to the HVAC subsystem (107).

11 Claims, 1 Drawing Sheet

ELECTRIC VEHICLE THERMAL MANAGEMENT SYSTEM

FIELD OF THE INVENTION

The present invention relates generally to electric vehicles and, more particularly, to a method and apparatus for efficiently managing the thermal loads in an electric vehicle.

BACKGROUND OF THE INVENTION

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. One of the principal issues involved in designing an efficient electric drive train as well as a vehicle that is "user friendly" is thermal management, primarily due to the required operating conditions of the battery cells and the need to provide on-demand heating and cooling within the passenger cabin. To date, electric vehicle thermal management systems have had limited capabilities, been overly complex, or both. For example, early generation electric vehicles often used multiple independent heat management subsystems. Such an approach is inherently inefficient as each heat management subsystem requires its own components (e.g., pumps, valves, refrigerant systems, etc.).

To overcome some of the problems associated with the use of independent thermal subsystems, U.S. Pat. No. 6,360,835 and related U.S. Pat. No. 6,394,207 disclose a thermal management system utilizing multiple heat transfer circuits which share the same heat transfer medium. The heat transfer circuits are in fluid communication with one another, thus allowing hot heat transfer medium to flow from the high temperature circuit into the low temperature circuit, and cooler heat transfer medium to flow from the low temperature circuit into the high temperature circuit. Although this system appears to overcome some of the limitations of the prior systems, it is still relatively complex due to the interaction of the two heat transfer circuits.

Accordingly, what is needed in the art is a simplified thermal management system that meets the power train and HVAC system requirements of an electric vehicle. The present invention provides such a system.

SUMMARY OF THE INVENTION

The present invention provides an efficient thermal management system that utilizes a single heat exchanger. A refrigeration subsystem cools the heat exchanger. A first coolant loop in thermal communication with the heat exchanger is used to cool the energy storage system (e.g., a battery package). A second coolant loop corresponding to the HVAC subsystem is also in thermal communication with the heat exchanger. Preferably a third coolant loop corresponding to the drive motor cooling subsystem is coupleable to the HVAC coolant loop, thus providing an efficient means of providing heat to the HVAC subsystem.

In at least one embodiment of the invention, the refrigeration subsystem is comprised of a compressor, condenser, thermostatic expansion valve and a dryer/separator.

In at least one embodiment of the invention, the HVAC subsystem also includes a heater to provide a source of heat when the drive motor cooling subsystem is not warm enough to provide the desired heat, for example during initial vehicle operation.

In at least one embodiment of the invention, the drive motor cooling subsystem is comprised of a circulation pump, a radiator, and a coolant reservoir. Preferably the drive motor cooling subsystem is in thermal communication with the power electronics module, thereby providing a means of cooling the power electronics as well as the drive motor.

In at least one embodiment of the invention, the first coolant loop is further comprised of a circulation pump and a coolant reservoir. Preferably a source of heat is in thermal communication with the first coolant loop, thus providing a means of warming up the energy storage system during initial vehicle operation.

A further understanding of the nature and advantages of the present invention may be realized by reference to the remaining portions of the specification and the drawings.

DESCRIPTION OF THE SPECIFIC EMBODIMENTS

Figure 1:
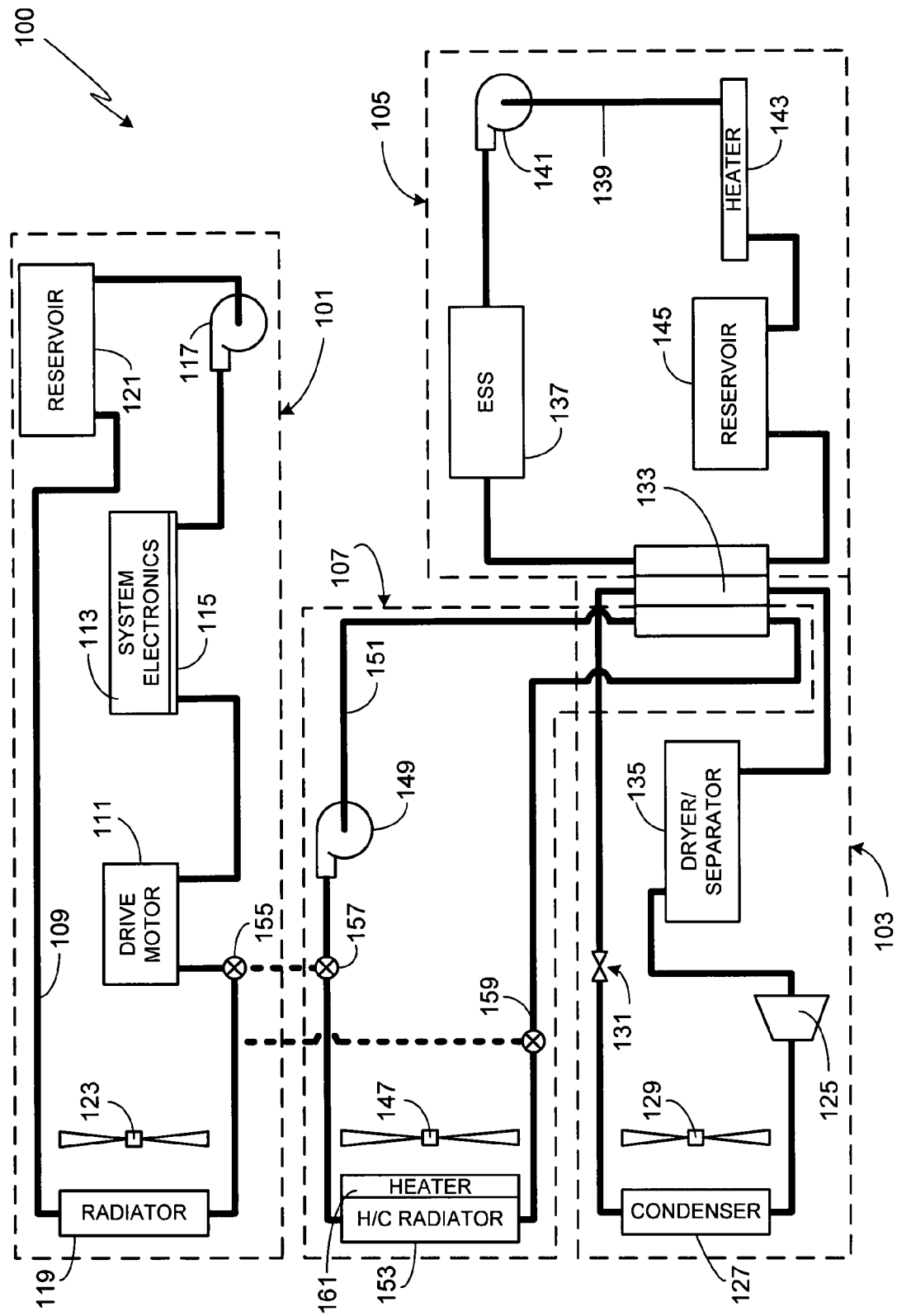
FIG. 1 is a schematic illustration of a thermal management system in accordance with the invention.

FIG. 1 schematically illustrates a thermal management system 100 in accordance with a preferred embodiment of the invention. System 100 is comprised of four subsystems; power train cooling subsystem 101, refrigeration subsystem 103, battery cooling subsystem 105, and heating, ventilation and cooling (HVAC) subsystem 107. Each subsystem will now be described in detail.

Subsystem 101 is comprised of a continuous power train cooling loop 109 which is used to cool drive motor 111, the vehicle's principal traction motor. Preferably cooling loop 109 is also used to cool various system electronic components 113 (e.g., the power electronics module for motor 109). System electronics 113 are preferably mounted to a cold plate 115 which is used to transfer the heat away from the electronics and into the liquid coolant (i.e., the heat transfer medium) contained in the cooling loop. Cooling loop 109 also includes a pump 117 to circulate the coolant through the cooling loop, a radiator 119 for discharging the heat to the ambient atmosphere, and a coolant reservoir 121. Preferably the system also includes a fan 123 for forcing air through radiator 119 when insufficient air is passing through the radiator to achieve the desired level of cooling, for example when the vehicle is not moving.

Refrigeration subsystem 103 is comprised of a compressor 125, condenser 127, fan 129, thermostatic expansion valve 131, heat exchanger 133 and dryer/separator 135. Compressor 125 compresses the low temperature refrigerant vapor in the subsystem into a high temperature vapor. The refrigerant vapor then dissipates a portion of the captured heat when it passes through condenser 127, thereby leading to a phase change from vapor to liquid, the liquid remaining at a high temperature and pressure. Preferably the performance of condenser 127 is enhanced by using a blower fan 129. The liquid phase refrigerant then passes through thermal expansion valve 131 which lowers both the temperature and pressure of the refrigerant as well as controlling the flow rate of refrigerant into heat exchanger 133. Heat exchanger 133 provides a simple means for transferring heat between the refrigerant contained in subsystem 103 and the coolants contained in the other subsystems. After being heated in heat exchanger 133, the refrigerant is separated into the liquid and vapor phases by dryer/separator 135, thus insuring that only vapor passes through compressor 125. It should be appreciated that although refrigeration subsystem 103 is preferred, the invention can utilize other refrigeration subsystems as long as the utilized refrigeration subsystem includes a heat exchanger which can be used cooperatively with the other thermal subsystems of the vehicle as described herein.

Battery cooling subsystem 105 includes the energy storage system 137 (ESS) coupled to a coolant loop 139 containing the coolant (i.e., a heat transfer medium). In a typical electric vehicle, ESS 137 is comprised of a plurality of batteries. The coolant is pumped through ESS 137, typically via a heat transfer plate (not shown) coupled to ESS 137, by circulation pump 141. During normal operation, the coolant contained in loop 139 is cooled via heat transfer with the refrigerant in heat exchanger 133. Additionally, in a preferred embodiment of the invention, cooling loop 139 is also thermally coupled to a heater 143 (e.g., a PTC heater), thus insuring that the temperature of ESS 137 can be maintained within its preferred operating range regardless of the ambient temperature. Subsystem 105 also includes a coolant reservoir 145.

Heating, ventilation and cooling (HVAC) subsystem 107 provides temperature control for the vehicle's passenger cabin. It includes a fan 147 which is used to circulate air throughout the cabin on demand, regardless of whether the air is heated, cooled, or simply fresh air from outside the vehicle. To provide cool air, circulating pump 149 circulates coolant contained within coolant loop 151 through radiator 153, the coolant contained in loop 151 being cooled by heat transfer with the refrigerant in heat exchanger 133. To provide warm air during normal vehicle operation, subsystem 107 is coupled to subsystem 101 via flow control valves 155, 157, and 159, thus allowing the coolant heated by subsystem 101 to flow through radiator 153. Additionally, in a preferred embodiment of the invention, a heater 161 (e.g., a PTC heater) is integrated within radiator 153, thus allowing cabin heating prior to that achievable by subsystem 101 alone.

It will be appreciated that there are numerous ways of controlling the amount of cooling supplied by refrigeration subsystem 103 to the other subsystems. One approach is through the use of valves, for example a valve within coolant loop 139 can be used to control the flow of coolant through the battery cooling subsystem 105 and thus the level of cooling achieved via heat exchanger 133. Similarly a valve within coolant loop 151 can be used to control the flow of coolant through HVAC subsystem 107 and thus the level of cooling achieved via heat exchanger 133. Alternately, as both the battery cooling subsystem 105 and the HVAC subsystem 107 place a thermal load on heat exchanger 133 of refrigeration subsystem 103, by simply varying the speed of the two coolant circulation pumps within these two subsystems, i.e., coolant pumps 141 and 149, respectively, the level of cooling achieved by the two subsystems is continuously variable, thereby avoiding the necessity of valves within the coolant loops.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electric vehicle thermal management system comprising:
    a refrigeration subsystem comprising a refrigerant and a heat exchanger;
    a first coolant loop in thermal communication with an energy storage system and in thermal communication with said heat exchanger;
    a heating, ventilation and cooling (HVAC) subsystem comprising a second coolant loop in thermal communication with said heat exchanger;
    a power train cooling subsystem, said power train cooling subsystem comprising a third coolant loop in thermal communication with a vehicle drive motor and in thermal communication with a radiator; and
    means for controllably and fluidly coupling said second coolant loop to said third coolant loop, wherein said means for controllably and fluidly coupling provides a means for allowing and preventing coolant fluid exchange between said second and third coolant loops.

2. The electric vehicle thermal management system of claim 1, said HVAC subsystem further comprising a radiator and a blower fan.

3. The electric vehicle thermal management system of claim 2, said second coolant loop further comprising a coolant pump.

4. The electric vehicle thermal management system of claim 2, further comprising a heater in thermal communication with said radiator.

5. The electric vehicle thermal management system of claim 1, said first coolant loop further comprising a coolant pump and a coolant reservoir.

6. The electric vehicle thermal management system of claim 5, further comprising a heater in thermal communication with said first coolant loop.

7. The electric vehicle thermal management system of claim 1, wherein said means for controllably and fluidly coupling means comprises a first flow control valve within said third coolant loop and a pair of flow control valves within said second coolant loop.

8. The electric vehicle thermal management system of claim 1, said refrigeration system further comprising a compressor, a condenser and a thermostatic expansion valve.

9. The electric vehicle thermal management system of claim 1, said energy storage system further comprising a plurality of batteries.

10. The electric vehicle thermal management system of claim 1, said third coolant loop further comprising a coolant pump and a coolant reservoir.

11. The electric vehicle thermal management system of claim 1, said power train cooling subsystem further comprising a power electronics module in thermal communication with said third coolant loop.

* * * * *